US008827678B2

(12) United States Patent
Moulin

(10) Patent No.: US 8,827,678 B2
(45) Date of Patent: *Sep. 9, 2014

(54) MOULDING AND FITTING SYSTEM

(75) Inventor: Jacky Moulin, Sainte Marie Laumont (FR)

(73) Assignee: Moulindustrie, Sainte Marie Laumont (FR)

( * ) Notice: Subject to any disclaimer, the term of this patent is extended or adjusted under 35 U.S.C. 154(b) by 424 days.

This patent is subject to a terminal disclaimer.

(21) Appl. No.: 13/139,391

(22) PCT Filed: Dec. 2, 2009

(86) PCT No.: PCT/EP2009/066269

§ 371 (c)(1),
(2), (4) Date: Aug. 12, 2011

(87) PCT Pub. No.: WO2010/066622

PCT Pub. Date: Jun. 17, 2010

(65) Prior Publication Data

US 2011/0293769 A1    Dec. 1, 2011

(30) Foreign Application Priority Data

Dec. 12, 2008  (FR) ...................... 08 58518

(51) Int. Cl.
*B29C 45/00*  (2006.01)

(52) U.S. Cl.
USPC ......................................... 425/161

(58) Field of Classification Search
CPC .................... B29C 45/0006; B29C 31/006
USPC ......................................... 425/161
See application file for complete search history.

(56) References Cited

U.S. PATENT DOCUMENTS

| 5,906,841 | A * | 5/1999 | Bak ............................... 425/556 |
| 7,874,830 | B2 * | 1/2011 | Moulin ......................... 425/317 |
| 2004/0222559 | A1 | 11/2004 | Gomes et al. |
| 2006/0151909 | A1 | 7/2006 | Kalemba et al. |

FOREIGN PATENT DOCUMENTS

| EP | 2 042 289 | 4/2009 |
| FR | 2 294 041 | 7/1976 |
| WO | WO 02/28622 | 4/2002 |
| WO | WO 2004/026562 | 4/2004 |

OTHER PUBLICATIONS

Preliminary Examination Report on Patentability in English, mailed Jul. 28, 2011; for PCT/EP2009/066269 (corrected version).
International Search Report for PCT/EP2009/066269, mailed Jun. 25, 2010.
Written Opinion for PCT/EP2009/066269, mailed Jun. 25, 2010.

* cited by examiner

*Primary Examiner* — Alison Hindenlang
(74) *Attorney, Agent, or Firm* — Nixon & Vanderhye PC

(57) ABSTRACT

The invention relates to a molding and fitting system (100) for a first part and a second part, including: two guide rails (102); a carriage (108) translatably movable on the guide rail (102); a series of first recesses (120); a maneuvering gear mounted on the carriage (108) and rotatably movable about an axis perpendicular to the movement direction of the carriages (108); a series of second recesses (116) mounted so as to be capable of moving between a lower position and an upper position; a rack adapted so as to move in parallel with the guide rail (102) and for meshing with the moving gears of the carriage (108); a locking device (106) adapted for alternately locking said carriage (108) with the rack and the guide rail; and an actuation device (04) for moving the rack.

5 Claims, 5 Drawing Sheets

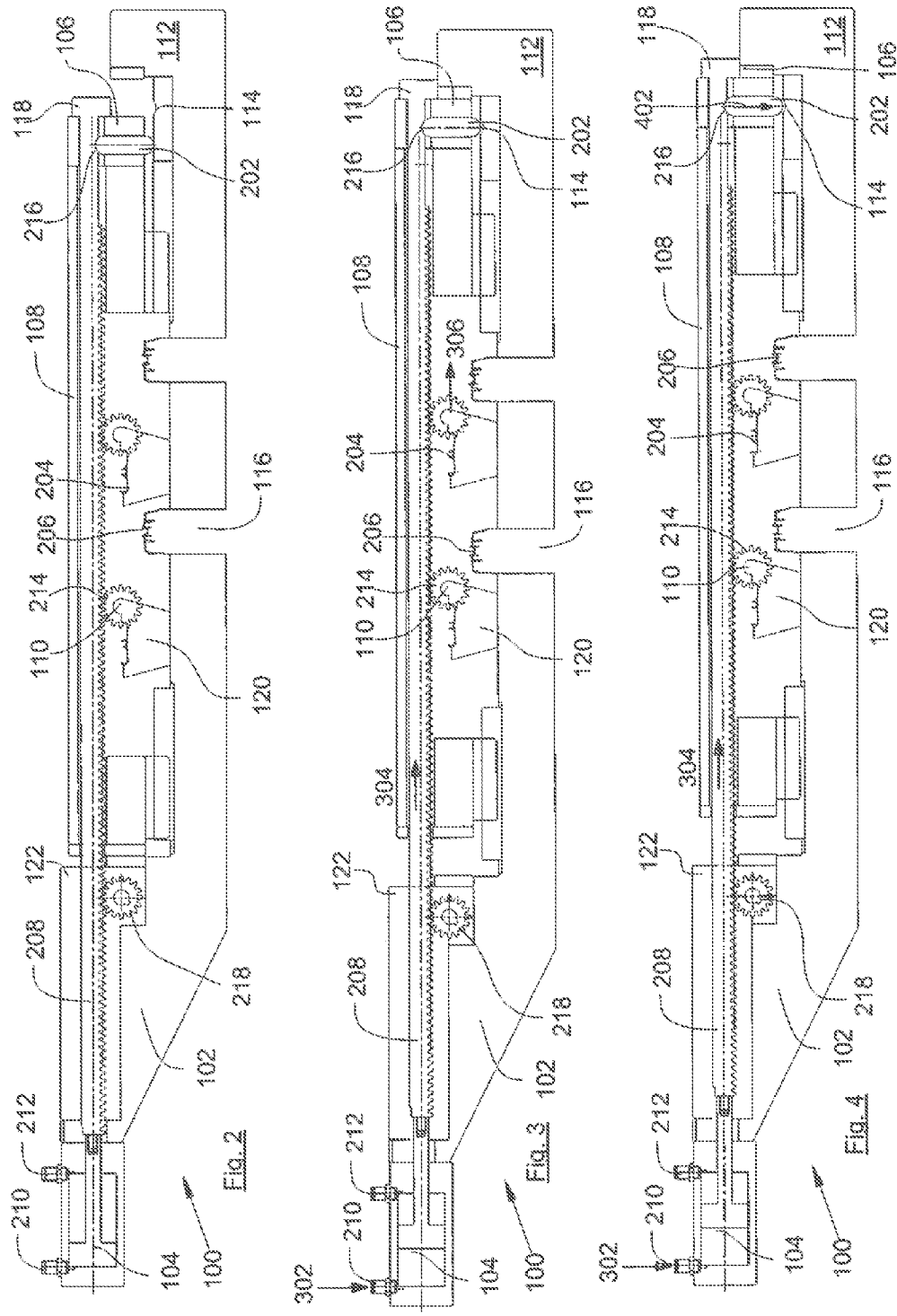

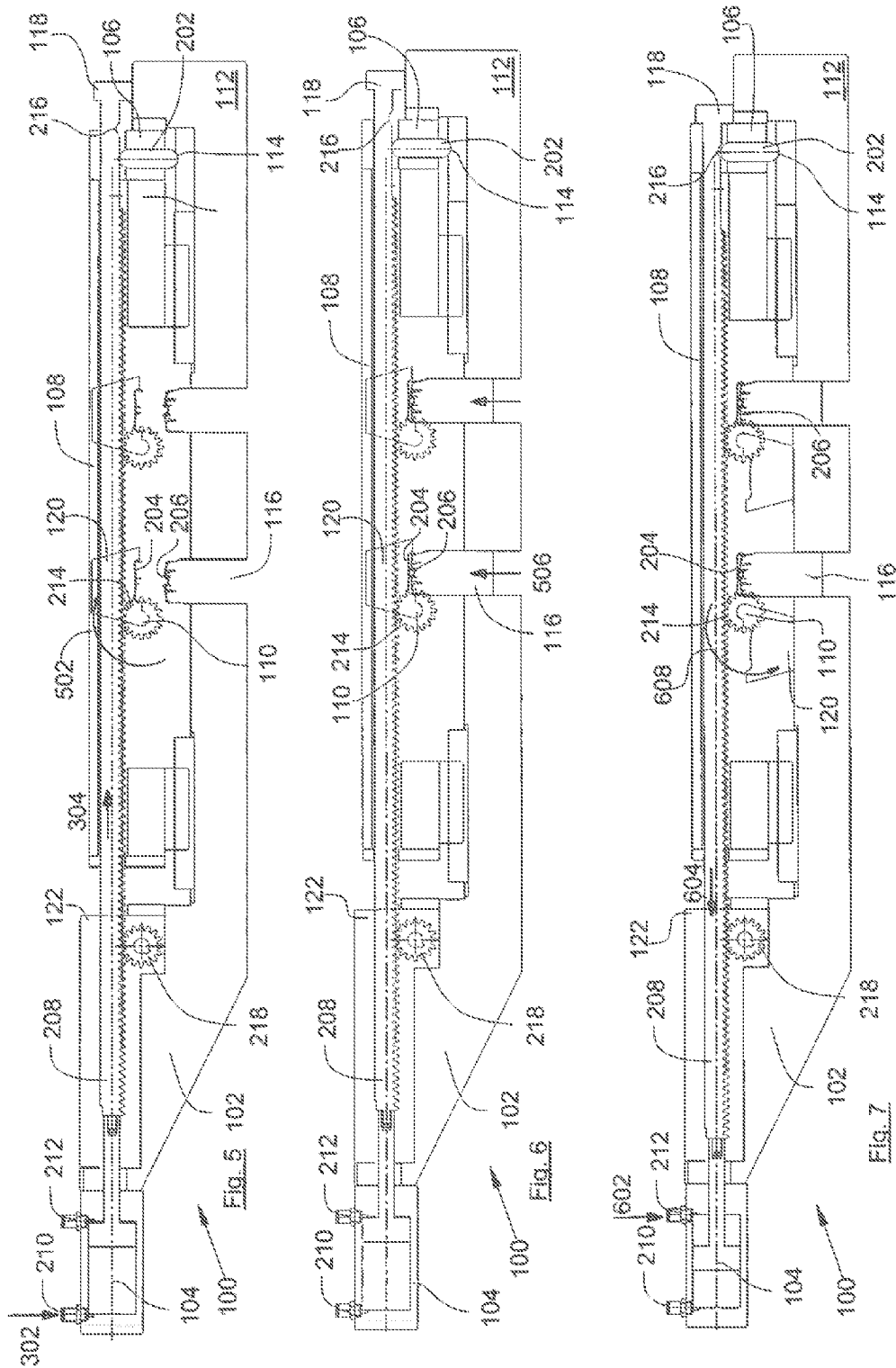

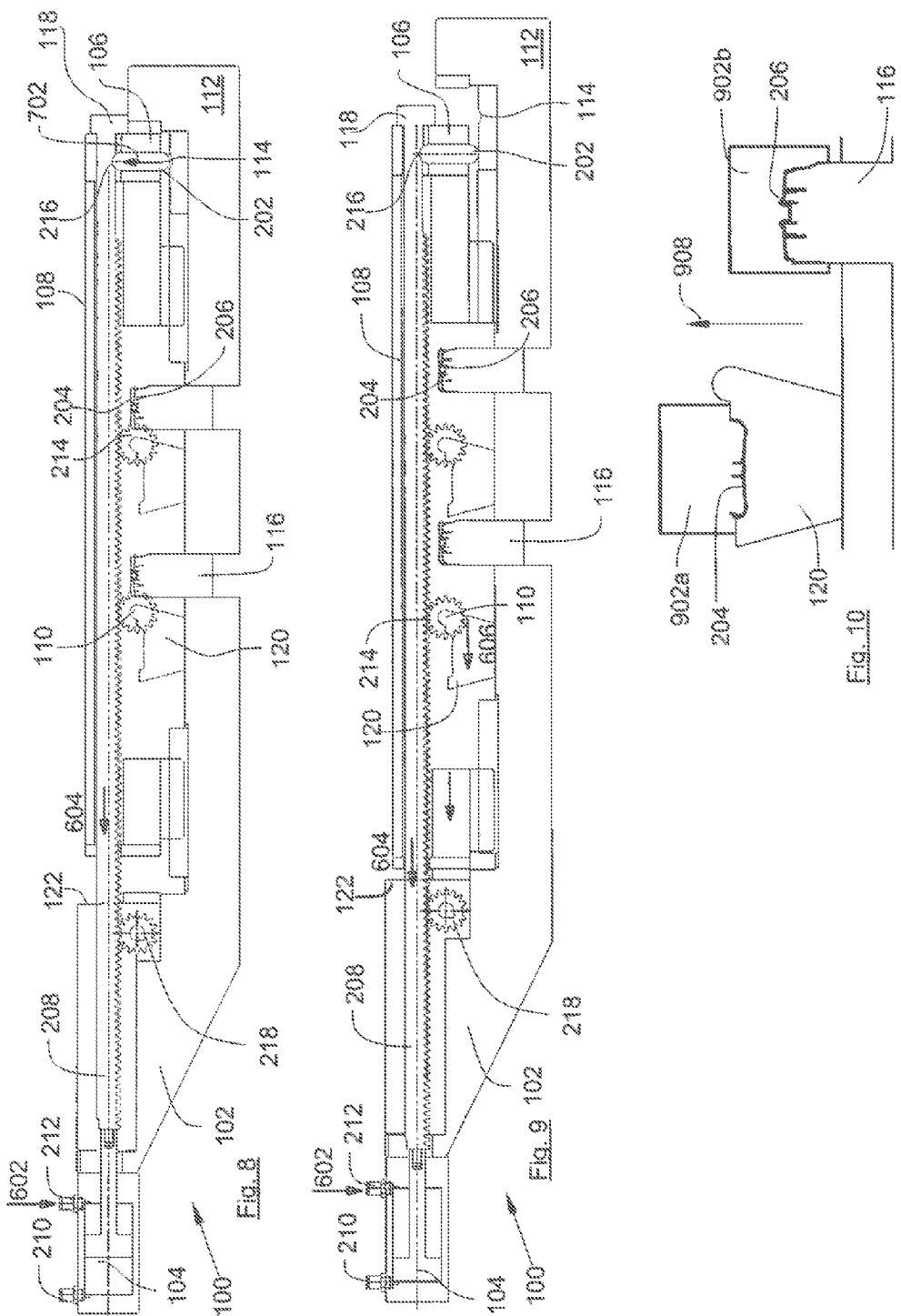

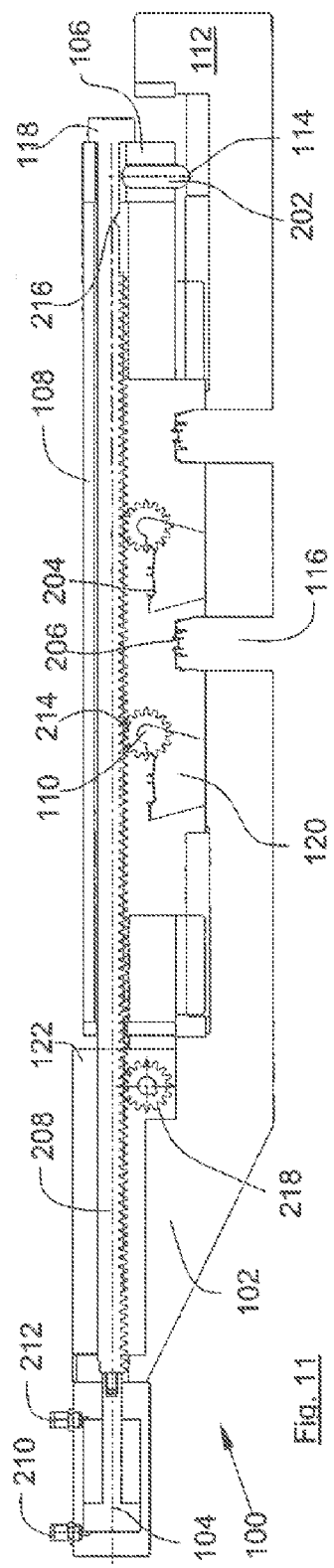

MOULDING AND FITTING SYSTEM

Figure 1:
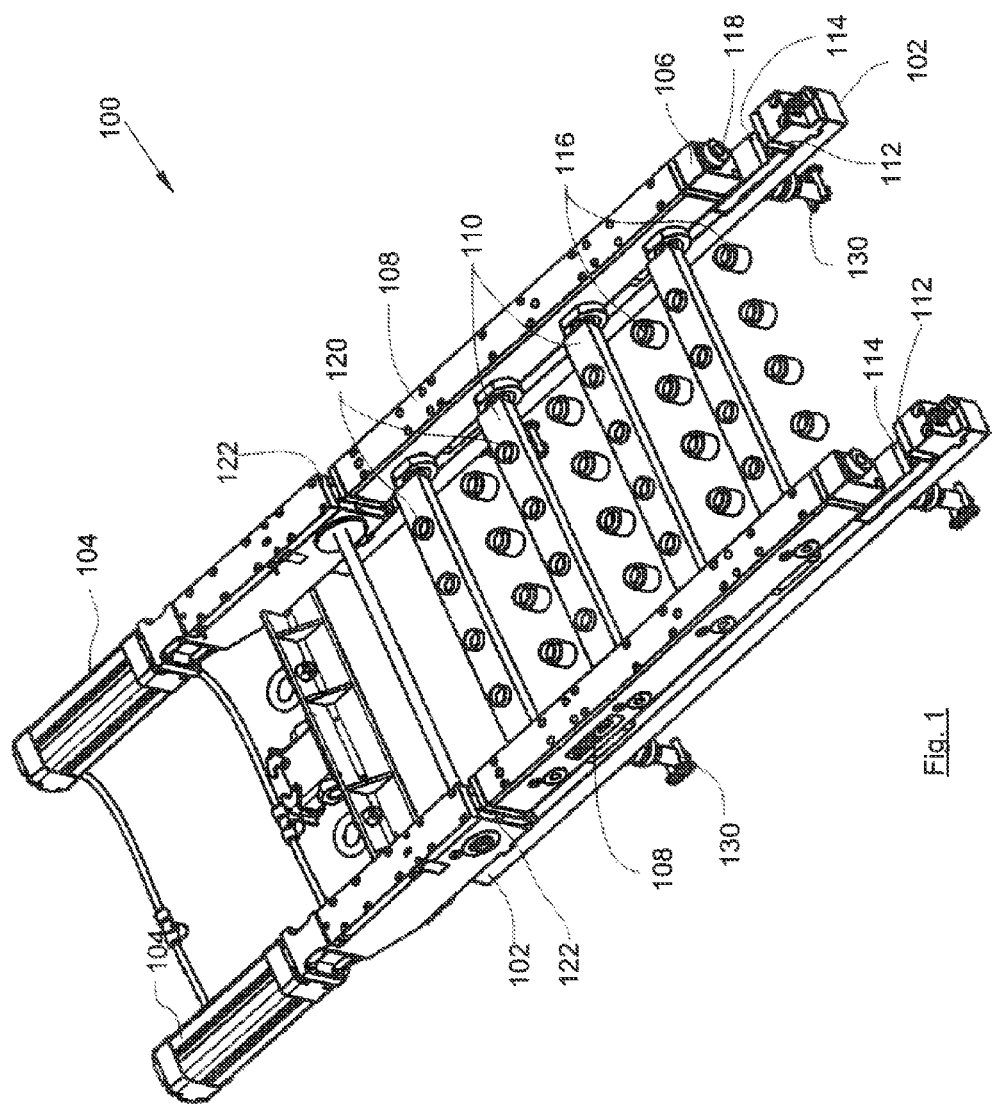

This application is the U.S. national phase of International Application No. PCT/EP2009/066269 filed 2 Dec. 2009 which designated the U.S. and claims priority to FR Patent Application No. 0858518 filed 12 Dec. 2008, the entire contents of each of which are hereby incorporated by reference.

The present invention concerns a moulding and fitting system for two parts.

A cap of the type for a bottle containing a liquid product such as shampoo, conditioner, washing-up product or the like, generally comprises a body and a lid. The body is intended to fit on the bottle and the lid is intended to be manoeuvred from a closed position to an open position and vice versa to enable the product to be retained in the bottle or to flow out of the bottle.

Such caps can also be used in other sectors such as for example the automobile sector or in the medical field.

Producing such a cap comprises a step of moulding the body and a step of moulding the lid. The body and lid are then directed to a fitting station where a body and a lid are fitted one in the other before being fixed to the neck of a bottle.

Producing a component consisting of two fitted-together moulded parts, such as for example a cap, requires a moulding station for a first part (the lid), a moulding station for a second part (the body) and a station for fitting together the first part and the second part. The financial cost of such stations is often high and the plurality of steps increases the manufacturing time.

A subject matter of the present invention is to propose a system for moulding and fitting two parts that does not have the drawbacks of the prior art.

To this end, a system for moulding and fitting a first part and a second part, for example of the type consisting of a lid and body of a cap, is proposed, the moulding and fitting system comprising:

at least two parallel guide rails,
for each guide rail, a carriage mounted so as to be translatably movable on the guide rail between a downstream stop and an upstream stop,
at least one series of first recesses, each first recess being intended to mould one of the first parts, each series of first recesses being carried by an assembly bar,
for the or each assembly bar and for each carriage, a manoeuvring gear mounted on the said carriage and able to move in rotation about a rotation axis perpendicular to the direction of movement of the carriages, the said assembly bar being mounted on each of the manoeuvring gears,
for the or each series of first recesses, a series of second recesses, each second recess being intended to mould one of the second parts,
each assembly bar being able to move in rotation between a first position in which each first series of recesses is not opposite the corresponding series of second recesses and a second position in which each first series of recesses is opposite the corresponding series of second recesses, and each series of second recesses being mounted to as to be able to move between a lower position in which the first part and the second part are not fitted together and an upper position in which the first part and the second part are fitted together,
for each carriage, a rack designed to move parallel to the said guide rail and to mesh with the manoeuvring gear or gears of the said carriage,
for each carriage, a locking device designed to lock the said carriage alternately with the rack and the guide rail, for each rack, an activation device designed to move the said rack.

Advantageously, the locking device comprises a latch, a first locking groove produced on the rack and a second locking groove produced on the guide rail, and the latch is designed to mesh alternately in the first locking groove or the second locking groove.

Advantageously, the latch takes the form of an oblong element and, when a first end with a radius cooperates with the first locking groove, the second end with a radius is in abutment on a surface of the guide rail and, when the second end with a radius cooperates with the second locking groove, the first end with a radius is in abutment on a surface of the rack.

Advantageously, each activation device is a pneumatic ram.

Advantageously, the first parts or the second parts are lids of a cap and, respectively, the second parts or the first parts are bodies of the cap.

The features of the invention mentioned above, as well as others, will emerge more clearly from a reading of the following description of an example embodiment, the said description being given in relation to the accompanying drawings, among which:

FIG. 1 shows a system for moulding and fitting together two parts according to the invention, FIGS. 2 and 9 show the various operating steps of the system for moulding and fitting together two parts according to the invention, FIG. 10 shows an embodiment of moulding recesses for a cap, and FIG. 11 shows a system for moulding and fitting together two parts according to another embodiment of the invention.

The invention will more particularly be described in the case of a cap consisting of a body and a lid.

FIG. 1 shows a system 100 for moulding and fitting together a first part and a second part, such as for example a lid 204 (FIG. 2) and a body 206 (FIG. 2) of a cap.

The moulding and fitting system 100 comprises a base consisting mainly of two parallel guide rails 102. Each guide rail 102 is mounted here on two securing bars 130 that secure the moulding and fitting system 100 to an injection press and mould assembly.

In the embodiment of the invention presented in the figures, there are two guide rails but, in the case of large parts to be moulded, it is possible to provide additional guide rails.

The moulding and fitting system 100 comprises, for each guide rail 102, a movable carriage 108. Each carriage 108 is able to move in translation longitudinally along the guide rail 102 in question between a downstream stop 122 and an upstream stop 112. Each carriage 108 is guided in translation on the guide rail 102 in question by any suitable devices and the stops 112 and 122 are disposed so as to enable each carriage 108 to move over an appropriate distance as will be understood more clearly below.

The two carriages 108 are disposed facing each other and are connected together by one or more assembly bars 110. Each assembly bar 110 takes the form of a rectilinear beam that extends between the two carriages 108 perpendicular to the direction of movement of the carriages 108. The number of assembly bars 110 varies according to the number of lines of caps that are moulded simultaneously by the injection press. Here four assembly bars 110 are shown in FIG. 1 and two are shown in FIGS. 2 to 9.

Each assembly bar 110 carries a series of first moulding recesses 120 and forms a rigid assembly with it. Each first moulding recess 120 is intended to mould a lid 204.

The moulding and fitting system 100 comprises, for each series of first recesses 120, a series of second moulding recesses 116 disposed between the two carriages 108, each of the second recesses 116 being intended to mould the body 206. For each cap, a first recess 120 is associated with a second recess 116.

Each assembly bar 110 is mounted so as to be able to move in rotation about a rotation axis parallel to the longitudinal direction of the assembly bar 110. In other words, the rotation axis is perpendicular to the direction of movement of the carriages 108.

As can be seen better in FIGS. 2 to 9, for each series of first recesses 120 and on each carriage 108, a manoeuvring gear 214 is mounted so as to be able to move in rotation about the rotation axis. Each end of each assembly bar 110 and therefore of each first moulding recess 120 is fixed to the manoeuvring gear 214 in question. Each manoeuvring gear 214 is able to move in rotation about its axis, which constitutes the rotation axis. Each assembly bar 110 is therefore subjected to a rotation movement about the axis of the manoeuvring gears 214 that carries it. As explained below, each assembly bar 110 and therefore each manoeuvring gear 214 and each series of first recesses 120 move between a first position in which each first series of recesses 120 is not opposite the corresponding series of second recesses 116 and a second position in which each first series of recesses 120 is opposite the corresponding series of second recesses 116. That is to say in the first position each lid 204 is not opposite the corresponding body 206 and in the second position each lid 204 is opposite the corresponding body 206.

As explained below, each carriage 108 is moved by a rack 208, the end of which is referenced 118. Each rack 208 is moved by an activation device, which is described below as a pneumatic ram 104 fixed to the guide rail 102 in question but which may be a hydraulic ram, an electric ram or an electric motor or the like. Each rack moves parallel to the guide rail 102.

Each guide rail 102 comprises a locking device 106 the functioning of which is explained below and which cooperates with locking grooves. Each locking device 106 is designed to lock the carriage 108 alternately with the rack 208 and the guide rail 102.

FIG. 10 shows an embodiment of the moulding recesses for a cap.

The lid 204 is produced using the first recess 120, which shapes the external part of the lid 204, and another recess, referred to as the third recess 902a, which shapes the internal part of the lid 204, that is to say the part that will subsequently fit on the body 206.

The body 206 is moulded from the second moulding recess 116, which moulds the bottom part of the body 206, that is to say the part that is intended to fit subsequently on the bottle, and another recess, referred to as the fourth recess 902b, which moulds the top part of the body 206 on which the lid 204 fits.

The series of first recesses 120 is the series that is carried by an assembly bar 110. The third recess 902a and the fourth recess 902b can form a single-piece assembly.

The four recesses 120, 116, 902a and 902b are associated with the injection press that supplies them with moulding materials.

After the moulding of the caps, each third recess 902a and each fourth recess 902b are moved in the direction of the arrow 908 so as to leave clear the space into which the lid 204 will be moved in order to fit on the body 206. Each lid 204 then rests on a first recess 120 and each body rests on a second recess 116.

FIGS. 2 to 9 show the various operating steps of the moulding and fitting system 110.

FIGS. 3, 4, 7 and 8 show the assembly bars 110 in the first position and FIGS. 5 and 6 show the assembly bars 110 in the second position. FIGS. 2 and 9 show the moulding and fitting system 100 respectively in the position of moulding the body 206 and the lid 204 and in the position of ejecting the cap.

FIG. 2 shows the moulding and fitting system 100 after the moulding of the body 206 and lids 204 and after release of the third recesses 902a and fourth recesses 902b.

The pneumatic ram 104 has a first inlet 210 and a second inlet 212. Each inlet 210, 212 is designed to be connected to a pressurised air source in order to activate the pneumatic ram 104. The use of air rather than oil avoids, in the event of leakage, contamination of the work station by oil.

The pneumatic ram 104 cooperates with the rack 208. The admission of air in the first inlet 210 causes the movement of the rack in a first direction and the admission of air in the second inlet 212 causes the movement of the rack in a second direction.

A guide gear 218 is mounted on the guide rail 102 and meshes with the teeth of the rack 208.

Each manoeuvring gear 214 meshes with the teeth of the rack 208.

The locking device 106 comprises a latch 202, a first locking groove 216 produced on the rack 208 and a second locking groove 114 produced in the guide rail 102. The latch 202 engages alternately in the first locking groove 216 and in the second locking groove 114, so as to lock the carriage 108 alternately with the rack 208 and the guide rail 102.

During the step in FIG. 2, the latch 202 is locked with the first locking groove 216, securing together the rack 208 and the carriage 108. The latch 202 takes the form of an oblong element each end with a radius of which cooperates with one of the locking grooves 114, 216. When a first end with a radius cooperates with the first locking groove 216, the second end with a radius slides over a surface of the guide rail 102. When the second end with a radius cooperates with the second locking groove 114, the first end with a radius slides over a surface of the rack 208.

During the step shown in FIG. 3, air is admitted (arrow 302) into the first inlet 210 of the pneumatic ram 104, which thus pushes the rack 208 (arrow 304). As the latch 202 is locked with the first locking groove 216 by abutment of the second end with a radius on the surface of the guide rail 102, the carriage 108 moves in translation on the guide rail 102 (arrow 306) and comes into abutment against the upstream stop 112. Each first recess 120 that carries a lid 204 and each assembly bar 110 follow the carriage 108. The assembly bar 110 then reaches the first position, that is to say the position in which the lid 204 is not opposite the body 206.

During the step shown in FIG. 4, air is admitted (arrow 302) into the first inlet 210 of the pneumatic ram 104, which thus continues to push the rack 208 (arrow 304). The latch 202 is released from the first locking groove 216 and locks with the second locking groove 114 (arrow 402) by abutment of the first end with a radius on the surface of the rack 208.

During the step shown in FIG. 5, air is admitted (arrow 302) into the first inlet 210 of the pneumatic ram 104, which thus continues to push the rack 208 (arrow 304).

As the latch 202 is released from the first locking groove 216, the rack 208 continues to advance. As the latch 202 is locked with the second locking groove 114, the carriage 108 remains immobile. Continuation of the movement of the rack 208 causes the rotation of the manoeuvring gears 214 and therefore the rotation of the assembly bars 110 and the first recesses 120 (arrow 502). The assembly bars 110 then reach the second position, in which the lid 204 is opposite the body 206.

The position of the upstream stop 112 is therefore designed so that, at the moment when the assembly bars 110 rotate, the lid 204 comes opposite the body 206 on which it is to be fitted.

During the step shown in FIG. 6, the second recess 114 that carries the body 206 moves in the direction of the lid 204, that is to say in the direction of the first recess 120 (arrow 506). This translation, which is substantially vertical, enables the lid 204 to be fitted on the body 206. For this purpose, the second recess 116 is mounted so as to be able to move between a low position in which the lid 204 and the body 206 are not fitted together (FIGS. 2, 3 and 4) and a high position in which the lid 204 and the body 206 are fitted together (FIGS. 6, 7, 8 and 9).

During the step shown in FIG. 7, air is admitted (arrow 602) into the second inlet 212 of the pneumatic ram 104, which thus attracts the rack 208 (arrow 604). As the latch 202 is locked with the second locking groove 114, the carriage 108 remains immobile and the rack 208 moves without moving the carriage 108.

The movement of the rack 208 causes the rotation of the manoeuvring gears 214 and therefore the rotation of the assembly bars 110 and the first recesses 120 (arrow 608), which then return to the first position. Each lid 204 is detached from the first recess 120, which carries it during this rotation.

During the step shown in FIG. 8, air is admitted (arrow 602) into the second inlet 212 of the pneumatic ram 104, which thus continues to attract the rack 208 (arrow 604). The latch 202 is released from the second locking groove 114 and locks with the first locking groove 216 (arrow 702).

During the step shown in FIG. 9, air is admitted (arrow 602) into the second inlet 212 of the pneumatic ram 104, which thus continues to attract the rack 208 (arrow 604). As the latch 202 is locked with the first locking groove 216, the carriage 108 moves in translation on the guide rail 102 (arrow 606) and comes into abutment against the downstream stop 122. Each first recess 120 and each assembly bar 110 follow the carriage 108 and return to their starting position in FIG. 2.

Each cap thus produced can be ejected from the second recess 116, which returns to its starting position in FIG. 2. A new injection/moulding, fitting and ejection cycle can take place.

Implementation of the moulding and fitting system 100 is particularly simple and the functioning thereof is easy to manage since there is, per guide rail 102, only one element to be controlled, the pneumatic ram 104. The movement of the second recesses 116 can be controlled by any suitable means.

Thus, for each rack 208, the activation device 104 moves the rack 208 firstly in the first direction 304 so as to bring each carriage 108 into abutment against its upstream stop 102 when the locking device 106 locks the carriage 108 with the rack 208, and then, when the locking device 106 locks the carriage 108 with the guide rail 102, so as to cause each manoeuvring gear 214 to undergo a rotation that brings each series of first recesses 120 from the first position to the second position, a movement during which each first recess 120 drives the lid 204 to a position opposite the body 206, and secondly in the second direction 604 so as, when the locking device 106 locks the carriage 108 with the guide rail 102, to cause each manoeuvring gear 214 to undergo a rotation that returns each series of first recesses 120 from its second position to its first position, and then, when the locking device 106 locks the carriage 108 with the rack 208, so as to bring each carriage 108 into abutment against its downstream stop 122.

After the moulding of the caps 204, 206 and the release of the third recess 902a and the fourth recess 902b, the method of fitting together the body 206 and the lid 204 comprises:

- a step of moving in translation the carriages 108 and the first recesses 120 that are linked thereto as far as the first position,
- a step of stopping the movement when the first recesses 102 are correctly positioned, that is to say when each first recess 120 is in the vicinity of the associated second recess 116, this position corresponding to the carriages 108 being put in abutment against the upstream stops 112,
- a step of rotating the first recesses 120, which pass into the second position,
- a step of stopping the rotation when the first recesses 120 have turned sufficiently for each lid 204 to be opposite the corresponding body 206,
- a step of lifting the second recess 116 so that the body 206 and the lid 204 fit together,
- a step of rotating the first recesses 120 in a reverse direction of rotation,
- a step of stopping the rotation in the reverse direction when the first recesses 120 have returned to the first position,
- a step of moving the carriages 108 and the first recesses 120 in translation in a direction opposite to the first movement step,
- a step of stopping the movement when the carriages 108 are in abutment against the downstream stops 122, and
- a step of lowering each second recess 116.

Each cap thus produced can then be ejected from the second recess 116.

Naturally, the present invention is not limited to the examples and embodiments described and depicted but is capable of numerous variants accessible to persons skilled in the art.

For example, the invention has been described in particular in the case of a cap but it applies in the same way to any element comprising two moulded parts that are to be assembled together, and in particular the invention applies in the same way if the position of the body and the position of the lid are reversed.

The invention has been described in particular in the case of two guide rails, but it applies in the same way if there are more than two guide rails, each carrying a movable carriage moved by an activation device. Thus, for each series of first recesses 120 and for each carriage 108, a manoeuvring gear 214 is mounted on said carriage 108 and is able to move in rotation about a rotation axis perpendicular to the direction of movement of the carriages 102 and the series of first recesses 120 is mounted on each of the manoeuvring gears 214 of the carriages 108 that are associated with the said series of first recesses 120.

The invention has been described in particular in the case where the translation of the carriages 108 is effected prior to the rotation of the manoeuvring gears 214. However, in another embodiment shown in FIG. 11, the manoeuvring gears 214 are rotated prior to the translation of the carriages 108. The difference between the embodiment in FIG. 11 and that in the previous figures lies in the positions of the first locking groove 216 produced on the rack 208 and the second locking groove 114 produced in the guide rail 102.

Initially, the locking device 106 locks the said carriage 108 with the guide rail 102 by means of the latch 202, which is in engagement with the second locking groove 114.

The translation of the rack 208 then causes the rotation of the carriages 108 and the first recesses 120, which come to be placed in a first position in which they are inverted without being opposite the second recesses 116. When the rotation is terminated and the first recesses 120 are in this first position, the locking device 106 tilts and the latch 202 is released from the second locking groove 114 and locks with the first locking groove 216.

Continuation of the translation of the rack 208 causes the translation of the carriages 108 and the first recesses 120, which come into a second position opposite the first recesses 116, that is to say in the same position as that shown in FIG. 5, that is to say when the carriage 108 comes into abutment against the upstream stop 112.

This process then continues with the movement of the second recess 116, which carries the body 206 in the direction of the lid 204, that is to say in the direction of the first recess 120.

The return of the first recesses 120 into the initial position takes place in the reverse manner.

Thus, for each rack 208, the activation device 104 is designed to move the rack 208 firstly in a first direction so as to cause each series of first recesses 120 to pivot into its first inverted position but not opposite the corresponding series of second recesses 116, when the locking device 106 locks the carriage 108 with the guide rail 102, and then, when the locking device 106 locks the carriage 108 with the rack 208, to bring each carriage 108 into abutment against its upstream stop 112, so as to bring each series of first recesses 120 opposite the corresponding series of second recesses 116, and secondly, in a second direction, so as to bring each carriage 108 into abutment against its downstream stop 122, when the locking device 106 locks the carriage 108 with the rack 208, and then, when the locking device 106 locks the carriage 108 with the guide rail 102, to cause each manoeuvring gear 214 to undergo a rotation that returns each series of first recesses 120 from its first inverted position to its initial position.

The invention claimed is:

1. System (100) for moulding and fitting together a first part (204) and a second part (206), for example of the type consisting of a lid and body of a cap, the moulding and fitting system (100) comprising:
    at least two parallel guide rails (102),
    for each guide rail (102), a carriage (108) mounted so as to be translatably movable on the guide rail (102) between a downstream stop (122) and an upstream stop (112),
    at least one series of first recesses (120), each first recess (120) being intended to mould one of the first parts (204), each series of first recesses (120) being carried by an assembly bar (110),
    for the or each assembly bar (110) and for each carriage (108), a manoeuvring gear (214) mounted on the said carriage (108) and able to move in rotation about a rotation axis perpendicular to the direction of movement of the carriages (102), the said assembly bar (110) being mounted on each of the manoeuvring gears (214),
    for the or each series of first recesses (120), a series of second recesses (116), each second recess (116) being intended to mould one of the second parts (206),
    each assembly bar (110) being able to move in rotation between a first position in which each first series of recesses (120) is not opposite the corresponding series of second recesses (116) and a second position in which each first series of recesses (120) is opposite the corresponding series of second recesses (116), and each series of second recesses (116) being mounted to as to be able to move between a lower position in which the first part (204) and the second part (206) are not fitted together and an upper position in which the first part (204) and the second part (206) are fitted together,
    for each carriage (108), a rack (208) designed to move parallel to the said guide rail (102) and to mesh with the manoeuvring gear or gears (214) of the said carriage (108),
    for each carriage (108), a locking device (106) designed to lock the said carriage (108) alternately with the rack (208) and the guide rail (102), and
    for each rack (208), an activation device (104) designed to move the said rack (208).

2. Moulding and fitting system (100) according to claim 1, wherein the locking device (106) comprises a latch (202), a first locking groove (216) produced on the rack (208) and a second locking groove (114) produced on the guide rail (102), and wherein the latch (202) is designed to engage alternately in the first locking groove (216) or the second locking groove (114).

3. Moulding and fitting system (100) according to claim 2, wherein the latch (202) takes the form of an oblong element and in that, when a first end with a radius cooperates with the first locking groove (216), the second end with a radius is in abutment on a surface of the guide rail (102), and wherein, when the second end with a radius cooperates with the second locking groove (114), the first end with a radius is in abutment on a surface of the rack (208).

4. Moulding and fitting system (100) according to claim 1, wherein each activation device (104) is a pneumatic ram.

5. Moulding and fitting system (100) according to claim 1, wherein the first parts or the second parts are lids (204) of a cap and in that, respectively, the second parts or the first parts are bodies (206) of the cap.

* * * * *